United States Patent
Bera et al.

(10) Patent No.: US 12,266,345 B2
(45) Date of Patent: Apr. 1, 2025

(54) AUTOMATIC SPEECH GENERATION AND INTELLIGENT AND ROBUST BIAS DETECTION IN AUTOMATIC SPEECH RECOGNITION MODEL

(71) Applicant: Accenture Global Solutions Limited, Dublin (IE)

(72) Inventors: Anup Bera, Greater Noida West (IN); Hemant Palivela, Maharashtra (IN)

(73) Assignee: Accenture Global Solutions Limited, Dublin (IE)

( * ) Notice: Subject to any disclaimer, the term of this patent is extended or adjusted under 35 U.S.C. 154(b) by 329 days.

(21) Appl. No.: 17/895,400

(22) Filed: Aug. 25, 2022

(65) Prior Publication Data
US 2024/0071367 A1  Feb. 29, 2024

(51) Int. Cl.
| | | |
|---|---|---|
| G10L 15/00 | (2013.01) | |
| G06F 3/0484 | (2022.01) | |
| G10L 13/047 | (2013.01) | |
| G10L 13/08 | (2013.01) | |
| G10L 15/01 | (2013.01) | |
| G10L 15/02 | (2006.01) | |
| G10L 15/06 | (2013.01) | |
| G10L 15/22 | (2006.01) | |
| G10L 21/0216 | (2013.01) | |

(52) U.S. Cl.
CPC ............ *G10L 15/01* (2013.01); *G06F 3/0484* (2013.01); *G10L 13/047* (2013.01); *G10L 13/08* (2013.01); *G10L 15/02* (2013.01); *G10L 15/063* (2013.01); *G10L 15/22* (2013.01); *G10L 21/0216* (2013.01); *G10L 2015/025* (2013.01)

(58) Field of Classification Search
CPC .......... G10L 15/22; G10L 15/26; G10L 13/08
See application file for complete search history.

(56) References Cited

U.S. PATENT DOCUMENTS

| | | | | |
|---|---|---|---|---|
| 5,987,405 | A * | 11/1999 | Bantz ................. | G10L 19/0018 704/235 |
| 7,617,106 | B2 * | 11/2009 | Schramm ............. | G10L 13/00 704/231 |
| 9,053,094 | B2 * | 6/2015 | Yassa .................. | G06F 40/51 |
| 11,961,511 | B2 * | 4/2024 | Gurbani .............. | G10L 15/26 |
| 2006/0149546 | A1 * | 7/2006 | Runge ................. | G10L 15/26 704/E15.045 |
| 2007/0027686 | A1 * | 2/2007 | Schramm ............. | G10L 13/00 704/235 |

* cited by examiner

*Primary Examiner* — Daniel Abebe
(74) *Attorney, Agent, or Firm* — Polsinelli PC (57) ABSTRACT

This disclosure relates generally to ASR and is particularly directed to automatic, efficient, and intelligent detection of transcription bias in ASR models. Contrary to a tradition approach to the testing of ASR bias, the example implementations disclosed herein do not require actual test speeches and corresponding ground-truth texts. Instead, test speeches may be machine-generated from a pre-constructed reference textual passage according short speech samples of speakers using a neural voice cloning technology. The reference passage may be constructed according to a particular target domain of the ASR model being tested. Bias of the ASR model in various aspects may be identified by analyzing transcribed text from the machine-generated speeches and the reference textual passage. The underlying principles for bias detection may be applied to evaluation of general transcription effectiveness and accuracy of the ASR model.

20 Claims, 2 Drawing Sheets

AUTOMATIC SPEECH GENERATION AND INTELLIGENT AND ROBUST BIAS DETECTION IN AUTOMATIC SPEECH RECOGNITION MODEL

BACKGROUND

Technical Field

This application relates generally to automatic speech recognition (ASR) and automatic speech generation and is particularly directed to automatic, efficient, and intelligent detection of transcription bias in ASR models and intelligent generation of speeches for training ASR models.

Background Technologies

ASR models are used in a broad range of application to transcribe speeches into texts. ASR models may be developed using training datasets containing training speeches and corresponding ground-truth texts. ASR models may be of general purpose or may be domain specific. Availability of training speech datasets of sufficient quantity with respect to speaker and content varieties may be limited in some domains and applications. A trained ASR model, either of generic use or domain specific, may be inaccurate and/or biased to a certain extent with respect to one or more speaker demographic characteristics, due to, for example, imbalance in training datasets. Testing or evaluation of ASR models for detecting such bias may be critical to their development and adoption. Traditionally, such inaccuracy and/or bias evaluation and detection may require a significant amount of test speech samples with corresponding ground-truth texts from speakers of a variety of demographic characteristics. Once biases are detected, collection of additional speech datasets for retraining and refinement of the ASRs may often rely on manual processes and can thus be burdensome.

BRIEF SUMMARY

In one aspect, this disclosure relates generally to ASR and is particularly directed to automatic, efficient, and intelligent detection of transcription bias in ASR models. Contrary to a tradition approach for the testing and detection of ASR transcription bias, the example implementations disclosed herein do not require actual test speeches and corresponding ground-truth texts. Instead, test speeches may be machine-generated from a pre-constructed reference textual passage according to short speech samples of speakers using a voice cloning technology. The reference passage may be constructed according to a particular target domain of the ASR model being tested. Bias of the ASR model in various aspects (e.g., with respect to speaker demographics) may be identified by analyzing transcribed texts from the machine-generated speeches and the reference textual passage, at for example, a phoneme level. The underlying principles for such bias detection may be applied to evaluation of general transcription effectiveness and accuracy of the ASR model.

In another related aspect, this disclosure further describes intelligent and automatic generation of speech datasets. Such machine-generated speech datasets may be used for the initial training of an ASR model. Alternatively, or additionally, such speech datasets may be automatically generated and tailored according to detected biases in an initially trained ASR model, and then used for retraining and refining the original ASR model in order to reduce the detected biases. The generation of the speech datasets may be based on a set of ground-truth texts and a set of acoustic features or parameters adjusted or mixed from those extracted from a variety set of known individual speeches.

In some specific example implementations, a system for bias detection in an ASR model is disclosed. The system may include a memory circuitry for storing computer instructions; a network interface circuitry; and a processor in communication with the network interface circuitry and the memory circuitry. The processor may be configured to execute the computer instructions from the memory circuitry to receive speech samples uttered by a plurality of speakers; determine a reference textual passage; convert the reference textual passage into a set of machine-generated speeches corresponding to the plurality of speakers by automatically processing the reference textual passage and the speech samples using an automatic neural voice cloning model; process the set of machine-generated speeches to produce a set of transcribed texts using at least one ASR model; and automatically quantify a bias in the at least one ASR model based on the set of transcribed texts and the reference textual passage.

IN some other specific example implementations of the system above, the processor may be further configured to execute the computer instructions to wherein the processor is further configured to execute the computer instructions to obtain a reference speech; extract a set of speech parameters from the reference speech; adjust the set of speech parameters to generate a modified set of speech parameters; generate at least one new speech based on the modified set of speech parameters; and retrain the ASR model using at least the at least one new speech.

DETAILED DESCRIPTION

This system will now be described in detail hereinafter with reference to the accompanied drawings, which form a part of the present disclosure, and which show, by way of illustration, various example implementations and embodiments. The system may, however, be embodied in a variety of different forms and, therefore, the disclosure herein is intended to be construed as not being limited to the embodiments set forth. Further, the disclosure may be embodied as methods, devices, components, systems, and/or platforms. Accordingly, embodiments of the disclosure may, for example, take the form of hardware, software, firmware or any combination thereof.

In general, terminology may be understood at least in part from usage in its context. For example, terms, such as "and", "or", or "and/or," as used herein may include a variety of meanings that may depend at least in part upon the context in which such terms are used. Typically, the term "or", if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for the existence of additional factors not necessarily expressly described, again, depending at least in part on context.

In a first aspect, this disclosure relates generally to testing and evaluation of the transcription performance of ASR models. ASR models are used in a broad range of application to transcribe speeches into texts. ASR models may be developed using training datasets containing training speeches and corresponding ground-truth texts. ASR models may be of general purpose or may be domain specific. A trained ASR model, either of generic use or being domain specific, may be inaccurate and/or biased to a certain extent with respect to one or more speaker demographic characteristics and other attributes, due to, for example, imbalance in training datasets. Testing or evaluation of ASR models against such inaccuracy and/or bias may be critical to their development and adoption. Traditionally, such inaccuracy/bias testing and evaluation may require a significant amount of test speech samples with corresponding ground-truth text from speakers of a variety of demographic characteristics.

For example, ASR models may be biased as to age, gender, ethnicity, race, and accent of the speaker. In other words, such ASR models may transcribe speeches more accurately for speakers of certain demographic attributes than for those having other demographic attributes. For example, an ASR model may transcribe more accurately for speeches from male speakers than female speakers. Such bias may appear in ASR models due to the biased and/or imbalanced dataset selection/construction during the model training process. In some instances, the machine-learning process during the training of the ASR model may be inherently biased towards certain speech features inadvertently linked to particular set of demographic characteristics.

As a particular example, an offshore call center may desire to select and deploy an ASR model in its platform to transcribe service calls. The offshore call center, for example, may be located in India whereas its major customers may be located in the U.S. As such, there is a high probability that one of the speakers within a service call to the call center is an Indian whereas another of the speakers is a U.S. national. However, existing candidate ASR models may have been trained on training datasets associated with speakers from regions with insufficient representation of either the US or India. The accuracy of such ASR models may thus potentially be biased towards speaker demographics as to geographic regions and ethnicities.

Transcription bias in a deployed ASR model by a company may greatly impact its business outcome. In some circumstances, bias may be preferred such that improved transcription accuracy may be ached for speeches of particular demographics. In most many other applications, transcription bias may not be desired and should be avoided if possible. More seriously in some situations, such bias may lead to incompliance with industrial standards and/or government regulations (particular with respect protected characteristics, such as gender and age). As such, it is critical for a business/organization to evaluate ASR bias when selecting and deploying the ASR models, and to constantly monitor and book-keeping the performance of any deployed ASR models in a production environment with respect to transcription bias towards or against various demographic attributes. Such evaluation, testing, and monitoring may be preferably conducted using test speeches of speakers that generally falls into the demographic characteristics of the user of the ASR models.

Monitoring of the ASR for bias may be based identifying disparities of transcription accuracy of speeches from speakers of various demographic characteristics. Such monitoring or evaluation thus may rely on test speeches with known texts. The bias detection may involve transcription of the test speeches and compare the transcribed texts to the known texts to derive transcription accuracy disparities. As such, it is traditionally critical to generate a large amount of original and actual test speeches in order to effectively monitoring and evaluating demographic bias in an ASR model. The current disclosure, in one aspect, concerns the generation of test speeches.

With respect to the detection of bias in the transcription of ASR models once test speeches are available, such bias detection in the ASR model should be generally only sensitive to transcription accuracy disparity in a set of pre-defined demographic characteristics such as age, gender, ethnicity, race, accent, and the like. Transcription accuracy disparities as a result of other characteristics in the speech or characteristics of speakers such as background noise in the speech, speaker language proficiency, mix-language in the speech, and phonetic variations, and the like, should not be attributed to ASR bias. For example, transcription error by an ASR model due to background noise or speaker language unproficiency should not be detected as a bias of the ASR model. Therefore, a bias detector may also need to be designed and constructed such that it is only sensitive to transcription inaccuracy disparities that are relevant to ASR bias of interest. The current disclosure, in another aspect, further concerns example detection algorithms that are highly effective in picking up transcription accuracy disparities due to, for example, demographic bias.

As mere examples, the disclosure below is particularly directed to an automatic, efficient, and intelligent detection of transcription bias in ASR models. For generation of test data for the detection of bias in the ASR models, contrary to tradition approaches, the example implementations disclosed herein do not require actual test speeches and corresponding ground-truth texts. Instead, test speeches may be machine-generated from a pre-constructed reference textual passage based on short speech samples of speakers using a neural voice cloning technology. The short speech samples may include actual voice of actual user of the ASR model which are independent of speaker language proficiency, phonetic variation, and the like. The reference passage may be constructed according to one or more particular target domains of the ASR model being tested or evaluated. Furthermore, bias of the ASR model in various aspects may be identified by transcription accuracy disparity with respect to demographic characteristics derived by performing a Phoneme Error Rate (PER) analysis of the transcribed texts from the machine-generated speeches and the reference textual passage. The underlying principles for bias detection may be applied to evaluation of general transcription effectiveness and accuracy of the ASR model.

Figure 1:
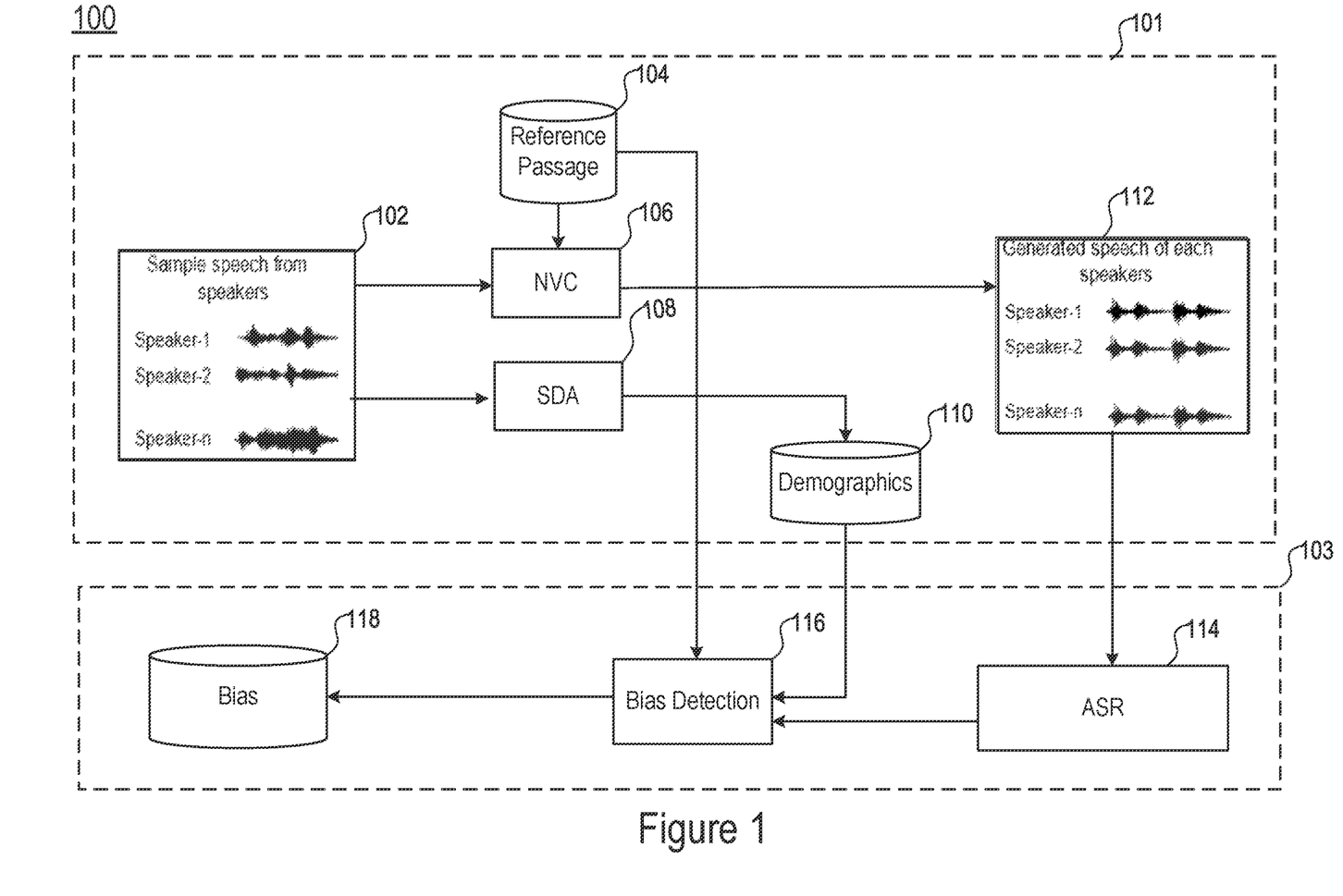
FIG. 1 illustrates a data and logic flow in an example system and method for automatic, efficient, and intelligent detection of demographic transcription bias in an ASR model.

FIG. 1 illustrates a data and logic flow 100 for an example implementation of this disclosure. The data and logic sub-flow 101 illustrates an example method and system for generating testing speeches whereas the data and logic sub-flow 103 shows an example method and system for detecting bias of a target ASR mode based on the test speeches generated in the data and logic sub-flow 101.

The test speech generation data and logic sub-blow 101 starts at step 102, in which sample speech data are collected. In particular, the sample speeches may be collected as speech segments from actual conversational voices of users of the ASR model. For the example of offshore call center above, user voice segments to be collected may come from service personnel of the call center in India and U.S. customers (both are users of the ASR models). In some implementations, a separate intelligent model such as a neural network may be developed to generate speech segments from recorded historical user speech data in a user database.

Such speech segments need not be long. In some example implementations, a predefined length of speech segments may be collected. For example, the predefined speech segment length may be 60-second (or any other predefined length). In some example implementations, the collected segments may be of various lengths up to a predefined maximum length (e.g., a maximum of 60-second, or any other maximum length).

In general, the selection of speech samples should take into consideration a balance of various user demographics. For example, it may be preferable that the speech samples collected in the process 102 are from users equally distributed across various demographic characteristics. For example, for detecting gender bias in an ASR model, the male and female speech samples may be collected such that they are distributed equally across, for example, age, ethnicity, race, accent, and other demographic characteristics.

In the example implementations of the current disclosure, there need not be any existing ground-truth text for the collected user speeches. In other words, the collected speech samples need not be specially prepared and read off by users according to any known reference texts as ground-truth texts. Instead, the collected sample speech segments may include any natural speech of the users. Such speeches need not be separately transcribed into texts. No ground-truth texts need to generated for the speech samples.

In some example implementations, the collected speech samples or segments may be optionally cleaned. For example, back ground noises may be detected and removed from the speech samples or segments to generated clean speech samples. The background noise may be detected based on Signal-to-Noise-Ratio (SNR) estimation techniques. An example background noise detection and removal tool may be found https://www.radioeng.cz/full-texts/2005/05_01_06_11.pdf, https://github.co/anicolson/DeepXi, the contents of which are herein incorporated by reference.

As further shown by a Speech Demographic Analysis (SDA) process 108, demographic information 110 associated with the speech samples collected at 102 may be generated. Such demographic information may be stored in a demographic information database. Such demographic information may include but is not limited to gender, age, ethnicity, race, accent, and the like of the users/speakers associated with the collected speech samples.

In some example implementations, the speaker demographic information may be obtained or extracted from the company's ASR user profiles which may have been already stored in the user database 110. If such recorded demographic information is not available in the user database, the speaker demographic information may instead be detected using deep learning models for the speech samples. In such situations, in order to obtain more accurate demographic information, assistance from sociolinguistic experts may be solicited. Accordingly, the data and logic sub-flow 101 may further include a user interface for interactively obtaining confirmation and/or adjustment/change of demographic information associated with the sample speeches from the sociolinguistic experts As shown by 104 in the data and logic sub-flow 101 of FIG. 1, a reference textual passage may be prepared. In some example implementations, the reference passage may be prepared such that it includes a variety words specific to the one or more domains pertinent to the application employing the ASR model and that at the same time is phonetically well-balanced.

For example, the reference passage 104 may be prepared according to an underline business domain of the ASR application. If the ASR application falls in the financial domain, then the reference passage may be created in a manner such that it covers most of the frequently used financial jargon and terms. To be phonetically well-balanced, when the reference passage is converted to a sequence of phonemes, the distribution of most phonemes should be balanced. For example, the reference passage may be generated such that the number of various phonemes may follow a phoneme distribution derived from a sufficient amount of normal speech text in the particular domain within a distribution discrepancy that is less than a predetermined threshold. Further, the phoneme sequence of the reference passage should preferably cover most of the phonemes exist in that particular language.

As further shown in the data and logic sub-flow 101, a voice cloning procedure 106 may be implemented to convert the reference passage 104 into test speeches 112 according to the sample speeches collected at 102 corresponding to each of the plurality users or speakers. The voice cloning 106 may be based on neural voice cloning (NVC) techniques using neural networks and/or other deep learning techniques. The function of the NVC is to generate a test speech for each sample speech collected at 102. The generated test speech corresponding to a particular user/speaker would thus emulate uttering of the reference passage by the user.

In such a manner, the reference passage and the test speech generate for a particular user/speaker forms a test dataset comprising a speech and its ground-truth text. As such, the reliance on the NVC helps avoid having to have ground-truth text for the original sample speeches collected at step 102. This approach assumes that the NVC is sufficiently accurate in producing machine-generates test speeches that are nearly natural with respect to the corresponding speakers. The test speeches so generated may further be independent of speaker language proficiency, phonetic variation, and the like. Examples of NVC techniques may be found in:
 https://qooqle.qithub.io/tacotron/publications/speaker_adaptation,
 github.com/CorentinJ/Real-Time-Voice-Cloning,
 https://proceedinqs.neurips.cc/paper/2018/file/4559912e7a94a9c32b09d8 94f2bc3c82-Paper.pdf, https://ai.qooqlebloq.com/2017/12/tacotron-2-generating-human-like-speech.html, https://www.descript.com/overdub; and
 https://www.readspeaker.ai/solutions/voice-cloning-software-readspeaker/, https://www.bbc.com/news/business-57761873.

These sources are herein incorporated by reference.

In some example implementations, the data and logic sub-flow 101 may further include evaluating performance of the NVC before using the generated test speeches for testing the ASR model. The NVC performance may be evaluated by checking speaker similarity metric using, for example, Speaker verification Equal Error Rate (SV-EER) and Style Similarity metric using Gross Pitch Error that compares original sample voice and generated voice, as detailed in https://arxiv.orq/pdf/2102.00151.pdf, which is herein incorporated by reference.

In some other alternative implementation not explicitly shown in FIG. 1, the company may arrange for the various users to read and record the reference passage and use the recorded speeches as the test speeches rather than relying on NVC. Accordingly, a user interface may be additional provided for the users/speakers to interactively provided the users/speakers with the reference passage, to instruct the users/speakers to dictate the reference package, and to record the speeches.

Once the test speeches are generated using any one of the approaches above, and as shown in the bias detection and evaluation sub-flow 103, the test speeches may then be fed to the ASR model to start the bias detection/evaluation process, as shown by 114. In particular, the test speeches based on the reference passage may be transcribed by the ASR model being tested to generated transcribed texts.

After the test speeches are transcribed by the ASR, the transcribed texts may be compared to the reference passage as the ground-truth text in order to perform bias detection, as shown by 116 of FIG. 1. As such, a bias detection unit/circuitry/module may be configured to receive the transcribed texts and the reference passage. In addition, the bias detection unit/circuit/module may be further configured to receive the demographic information associated with the users/speakers in order to particularly determine demographic bias of the ASR.

In some example implementations, the demographic bias detection may be based on Phoneme Error Rate (PER) analysis between the transcribed texts and the text of the reference passage. In order to perform PER analysis, the texts (including the transcribed texts and the texts for the reference passage) are first converted to phoneme sequences. Such conversion may be performed in various manners. Example text-to-phoneme tools can be found at, for example:

mcmusphinx.github.io/wiki/tutorialdict,
https://tophonetics.com/,
https://qithub.com/bootphon/phonemizer, and
https://qithub.com/karkirowle/relative phoneme analysis.

The contents above are herein incorporated by reference.

The phoneme sequences of the transcribed texts and the reference passage may then be compared to obtain the PER. The PER, for example, may be defined as a ratio between a number of phonemes transcribed in error and a total number of phonemes.

Alternatively, the demographic bias detection may be based on other error calculation methods, such as Character Error Rate (CER) and/or Word Error Rate (WER). In particular, the transcribed texts and the text of the reference passage may be compared at character level to obtain the CER or at the word level to obtain the WER. Either of these error rates may be used as the basis for quantifying the transcription bias of the ASR model.

In some example implementations, the PER may be preferred and may provide more accurate determination of the demographic bias of the ASR. Specifically, in some cases where words have similar pronunciation (homophone words), ASR may transcribe wrongly although they have phonetically similar sequences. For example, the words "cite", "sight", and "site" all have similar phoneme sequences. In this example scenario, the ASR model may correctly convert a test speech signal containing utterance of these words to a correct phoneme sequence but may, in the final outcome during a sentence construction step, convert the phoneme sequence to a wrong word. As such, using CER or WER may overestimate the transcribing error of the ASR in terms of the performance of its phoneme recognition capability, which may play a more critical overall role in speech recognition than the sentence construction portion. As such, PER may represent a more accurate assessment of the transcribing performance of an ASR than CER or WER.

With the PER information generated for the test speeches, the demographic bias of the ASR may then be quantified by the bias detection circuitry/unit/module. Bias detection may be performed with respect to one or more of the demographic characteristics, individually or in various combination. The bias detection would further rely on the demographic information associated with the test speeches described above, and shown as being fed to 116 from 104 in FIG. 1.

For example, for a detection of bias of the ASR with respect to gender, the transcribed texts of the test speeches may be segregated according to the demographic information into a male group and a female group. The PERs for the transcribed texts of the test speeches by the ASR in each of the groups may be statistically processed to generate an aggregated PER for each of the groups. The gender bias of the ASR model may then be quantified based on the aggregated PERs for the male group and the female group.

The statistical PER analysis or aggregation in the male and female groups may be performed in various manners. For example, the PERs within each of these groups may be simply averaged to obtain mean PERs as the aggregated PERs for the male group and the female group. Other manners for aggregating the PERs in each of the groups are also contemplated.

In some example implementations, the quantification of gender bias of the ASR model may be based on a distance (e.g., relative difference) between the aggregated PERs of the male and female groups. Such distance or difference may be calculated based on ANOVA statistical test, which can be found at https://en.wikipedia.org/wiki/Analysis_of_variance and herein incorporated by reference. In one example, the absolute difference of the aggregated PERs of the male group and the female group may be calculated and used to quantify the gender bias of the ASR model. Alternatively, the absolute difference may be normalized by the mean of the two aggregated PERs to generate a relative PER difference between the male group and the female group and used to quantify a level of the gender bias of the ASR model. The distance calculation above is provided merely as an example. Other manners in which distance between the aggregated PERs of the male and female group are also contemplated.

In some example implementations, a threshold PER distance or difference may be predefined (either absolute or relative) and used to provide a qualitative determination as to whether the ASR model is considered gender biased or not. Specifically, if the detected PER distance or difference is more significant that the threshold level, the ASR may be considered as gender biased. Otherwise, the ASR may be considered gender neutral. In other words, if there is a significant difference between male PER mean and female PER mean, we can claim that ASR model has gender biasness.

The example for gender bias quantification or qualification of the ASR model may be applied to other demographic attributes to detect, quantify, and/or qualify whether the ASR model is biased with respect to age, ethnicity, race, accent, and the like. In some other example implementations, two or more of these demographic characteristics may be combined to detect bias. For example, the above method using PER may be used to determined, quantify, and/or qualify whether and/or the extent to which the ASR model is biased with respect to Asian female speakers. For such example detection, the texts for the transcribe test speeches may be segregated into two groups, one associated with Asian female speakers and the other associated with the rest of the speakers, and the example PER analysis used to detect, quantify, and/or qualify bias applies.

The various bias determination or quantification may be generated and recorded as shown by 118 of FIG. 1. Based on such bias detection outcome, the company may further determine whether the ASR model is appropriate and suitable for the target application and whether it should be deployed. In some implementations, such bias detection may be performed on a plurality of candidate off-the-shelf ASRs trained by other third parties or vendors, and the least biased ASR with respect to one or more of the demographic characteristics may be chosen for deployment. The schemes described above facilitates an efficient generation of domain specific test speeches.

As described above for the first aspect of this current disclosure, a system and method for generating test speeches for detecting, quantifying, and/or qualifying bias in a target ASR model. The main steps of the example method include but are not limited to:

Collecting sample speech data from actual users/speakers using a target ASR model.

Extracting speaker demographic information, such as gender using predictive Machine Learning models.

Optionally validating and correct the above extracted speaker demographic information by sociolinguistic expert.

Preparing a reference passage which contains variety of domain-specific phonetic sounds/terms and are phonetically well balanced.

Generating test speech data for each speaker for the reference passage using, for example, NVC based on the speaker's original sample speech data.

Transcribing the test speech data using the target ASR model.

Converting the transcribed texts of the test speeches by the target ASR model and ground truth text (the reference passage above) to phoneme level sequences.

Calculating PER (phoneme error rate) for each of the test speeches by comparing its transcribed phoneme and actual passage phoneme with respect to gender, age, ethnicity, race, accent, and the like, either individually to in combination.

Detecting, quantifying, or qualifying transcription bias with respect to gender, age, ethnicity, race, accent, and the like, either individually to in combination based on the PERs associated with the test speeches.

This system and method disclosed above for the first aspect uses actual user sample speech data of the ASR model rather than any third-party speakers' data which may have no close relation with ASR model's actual user. Further, bias of the ASR model may be tested based on domain-specific text, rather than text given in existing test speeches. Such advantage is significant because ASR model could perform differently for different domain speech data due vocabulary variation. In addition, the system and method above do not require any manual transcription of the original sample speech data and do not require any ground truth text for the sample speech data. Furthermore, the bias detection describe above can be made only sensitive to transcription disparity with respect to the demographic characteristics while being insensitive to speaker proficiency, vocabulary variation, domain data, background noise, noisy data (overlapping voice, speaking in mixed language, reverberation, echo etc.) as a result of machine generation of test speeches. The bias detention scheme above is further based on PER which provide more accurate metrics for ASR model performance analysis. As such, more reliable and trustable bias result may be obtained. The approaches above are not limited to bias detection. They may be applicable to generally evaluate transcription performance of ASR models.

In a second aspect, the current disclosure further relates to automatic and intelligent generation of speech datasets. Such machine-generated speech datasets may be used for an initial training of an ASR model. Alternatively, or additionally, such speech datasets may be automatically generated and tailored according to detected biases in an initially trained ASR model as described above, and then may be used for retraining and refining the original ASR model in order to reduce the detected biases. In some other implementations, such machine-generates speeches may be used in sentiment analysis and emotion recognition, and the like. The generation of the speech datasets may be based on a set of ground-truth texts and a set of acoustic features or parameters adjusted or mixed from those extracted from a variety set of known individual speeches.

Generally, despite significant progress in the field of speech analytics, particularly in improving transcription accuracy, less effort has been focused on improving synthetic voices generation based on lower-quality or fewer training speech samples. There are many cases where there are very few samples in terms of variations in human voices as well as contents used for training speech to text models, resulting in the biases described above and other deficiencies of the ASR models. As such, a versatile synthetic voice generation may be critical for the training and retraining of more accurate and less biased ASR models.

For example, in many cases, there may be various datasets that contain thousands of speakers speaking in a specific language but with the same content. This might provide a basis for generation of synthetic voices but the synthetic voices so generated may be of a narrow type or domain. Synthetic voices generated in such a manner likely would provide limited variability in the datasets and any speech analytics solution such as ASR trained based on such synthetic voices would be insufficiently accurate in predicting or classifying a wider range of new information or unseen information ingested into the system.

In these situations, developing a method for generating voices with variable contents would greatly help introduce variability into the training datasets for the ASR models. In addition, voice/speech parameters may be varied/adjusted so voices having the same content but of distinct characteristics may be machine-synthesized. For example, adjusting selected voice parameters may enable generation of speeches of the same sentence with varied emotional characteristics. These parameters may also be applied to new contents for generating diverse set of voices with varying contents. The voice parameters of known speakers may be further adjusted for synthesizing speeches from newly machine generated speakers. All these aspects for synthetic speech generation, including expanded content, expanded emotion and other voice characteristics, and expanded effective speaker pool, would ultimately help provide varied and diverse set of machine-generated speeches that may be used for training and/or retaining ASR models to achieve improved transcribing accuracy and reduced bias.

In some example implementations, the voice parameters pertinent to an individual speaker and corresponding text may be extracted as speech parameters such as Mel-Frequency Cepstral Coefficients (MFCC), Linear Perceptive Coding (LPC) coefficients, PPLC coefficients, and the like. These coefficients may be adjusted and mapped to additional or expanded sentences (contents) that the user/developer can provide as additional ground truth. Corresponding audio/speech files may then be generated that match the additional text using text to speech conversation but with the extracted parameters with or without adjustment.

In some example implementations, a data/audio ingestion subsystem may be configured to ingest a particular audio file that has been created for an individual associated with his or her age, gender, accent, ethnic background, and the like. Such demographic information may be provided to the data/audio ingestion subsystem.

In some example implementations, speech parameters of the ingested audio file may be extracted. The extracted speech parameters, for example, may include MFCC and/or LPC coefficients. These coefficients may then be adjusted for generating speeches for different contents from the original audio file, and/or for different emotions for the same speaker, and/or for different newly created speakers. The machine generated speeches may be a mixture of the characteristics above. For example:

a new speech may be generated for the same speaker and different content with the same emotion;

a new speech may be generated for the same speaker and different content with different emotions;

a new speech may be generated for the same speaker and the same content with different emotions a new speech may be generated for a different machine-created speaker and the same content with the same emotion, a new speech may be generated for a different machine-created speaker and the same content with different emotions, a new speech may be generated for a different machine created-speaker and different content with the same emotion, a new speech may be generated for a different machine created-speaker and different content with different emotions.

These examples for expanding the speeches with respect to content, speaker, and emotion are merely non-limiting examples. The mix of speech so generated may take into consideration a balance between speaker, content, and emotions in order to provide datasets for more accurate training and/or retraining of the ASR models and to reduce bias, and for reducing the possibility of introducing new bias in existing ASR models. For example, the modification of the speech parameters may correlate with a quantification of various aspects of the detected bias of an existing ASR.

In some example implementations, for each individual speaker, either original speaker associated with the input speech sample above or a machine-created speaker, multiple audio or speech files may be generated. The multiple files corresponding to each of such speakers may be associated with different contents, different emotions, or a mixture thereof. The generation of such audio files for each of the speakers may be based on the adjustment of the speech parameters and speech contents, as described above.

Once the speech datasets are generated with the diversities in content, emotion, and speaker, they may be used for training a new ASR model or retraining an existing ASR model.

The content, emotion, and speaker expansion are merely non-limiting examples, expansion to other aspects of the speech may be implemented based on adjusting the speech parameters described above. In addition, the diverse set of speeches so generated are not limited to applications for training/retraining of ASR models. These datasets may be used for other wide range of purposes, such as sentiment analysis and emotion recognition.

Figure 2:
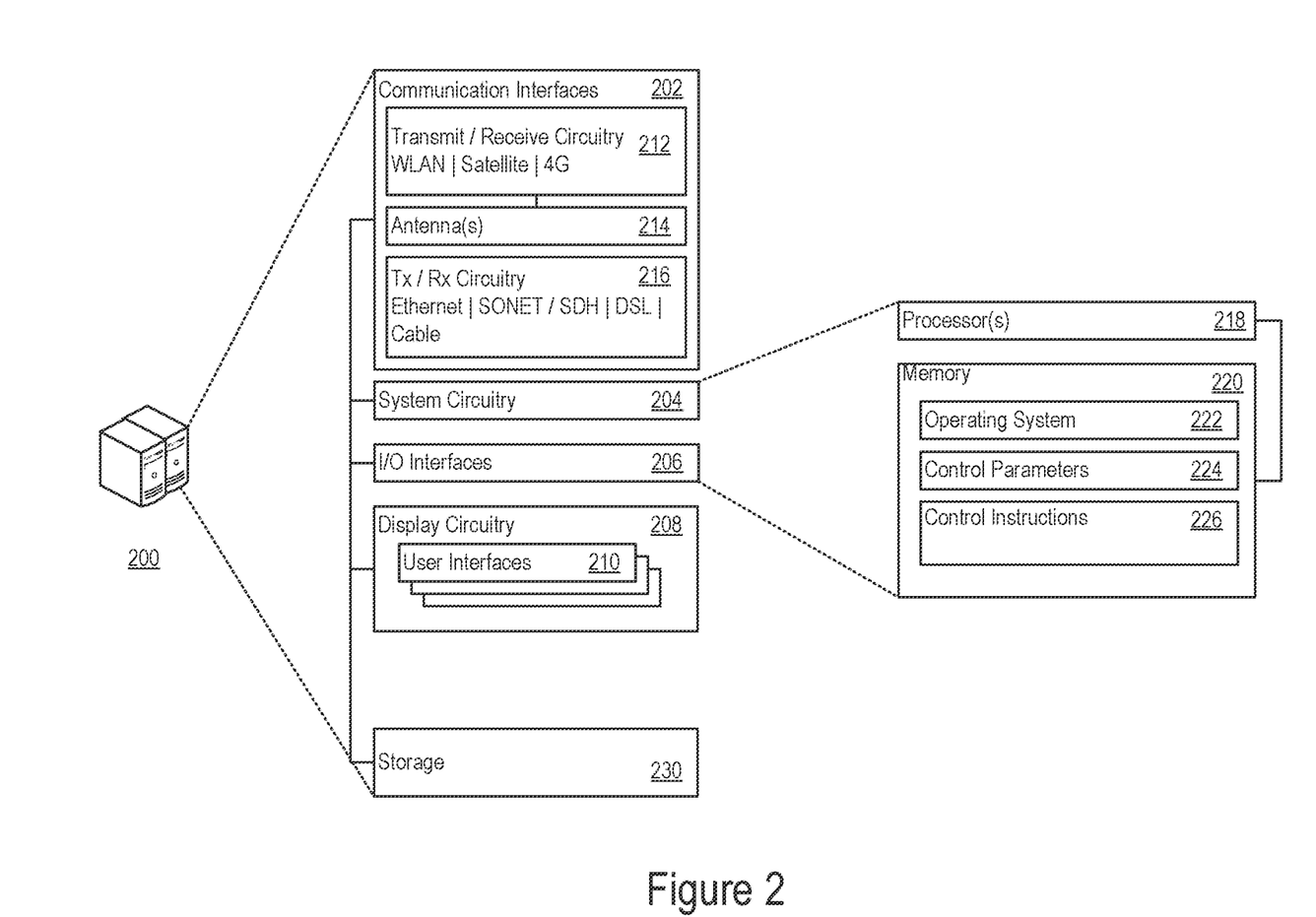
FIG. 2 illustrates an example computing device that may be used to implement various computing components of the example systems above.

Finally, FIG. 2 illustrates an exemplary architecture of a computing device 200 on which the various computing components of the system described above. The computing device 200 may include communication interfaces 202, system circuitry 204, input/output (I/O) interface circuitry 206, and display circuitry 208. The graphical user interfaces (GUIs) 210 displayed by the display circuitry 208 may be used to receive user commands/input and to display various outputs. The GUIs 210 may be displayed locally using the display circuitry 208, or for remote visualization, e.g., as HTML, JavaScript, audio, and video output for a web browser running on a local or remote machine.

The GUIs 210 and the I/O interface circuitry 206 may include touch sensitive displays, voice or facial recognition inputs, buttons, switches, speakers and other user interface elements. Additional examples of the I/O interface circuitry 206 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 202 may also include serial interfaces, such as universal serial bus (USB), serial ATA, IEEE 1394, lighting port, I²C, slimBus, or other serial interfaces. The communication interfaces 202 may also include wireline transceivers 216 to support wired communication protocols. The wireline transceivers 216 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 204 may include any combination of hardware, software, firmware, APIs, and/or other circuitry. The system circuitry 204 may be implemented, for example, with one or more systems on a chip (SoC), application specific integrated circuits (ASIC), microprocessors, discrete analog and digital circuits, and other circuitry. The system circuitry 204 may implement any desired functionality of the disclosed system and its various components. As just one example, the system circuitry 204 may include one or more instruction processor 218 and memory 220.

The memory 220 may be implemented as a non-transitory memory circuit and may store, for example, control instructions 222 for implementing the various functions described above, as well as an operating system 221. In one implementation, the processor 218 executes the control instructions 222 and the operating system 221 to carry out any desired functionality of the adaptive federated learning process above.

The computing device 200 may further include various data sources 230, or may be in communication with external data sources. Each of the databases that are included in the data sources 230 may be accessed by the various component of the disclosed system and its components.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

Many other modifications of the implementations above may be made to adapt a particular situation or material to the teachings without departing from the scope of the current disclosure. Therefore, it is intended that the present methods and systems not be limited to the particular embodiments disclosed, but that the disclosed methods and systems include all embodiments falling within the scope of the appended claims.

We claim:

1. A system comprising:
a memory circuitry for storing computer instructions;
a network interface circuitry; and
a processor in communication with the network interface circuitry and the memory circuitry, the processor configured to execute the computer instructions from the memory circuitry to:
receive speech samples uttered by a plurality of speakers;
determine a reference textual passage;
convert the reference textual passage into a set of machine-generated speeches corresponding to the plurality of speakers by automatically processing the reference textual passage and the speech samples using an automatic neural voice cloning model;
process the set of machine-generated speeches to produce a set of transcribed texts using at least one Automatic Speech Recognition (ASR) model; and
automatically quantify a bias in the at least one ASR model based on the set of transcribed texts and the reference textual passage.

2. The system of claim 1, wherein the processor is further configured to execute the computer instructions to automatically detect background noises in the speech samples.

3. The system of claim 2, wherein the processor is further configured to execute the computer instructions to automatically remove the background noises from the speech samples and convert the reference textual passage into the set of machine-generated speeches corresponding to the plurality of speakers by automatically processing the reference textual passage and the speech samples using the automatic neural voice cloning model and with the background noises removed from the speech samples.

4. The system of claim 1, wherein the processor is further configured to execute the computer instructions to:
extract demographic information of the plurality of speakers from the speech samples using an automatic demographic information extraction circuitry; and
automatically quantify the bias in the at least one ASR model based on the extracted demographic information of the plurality of the speakers in addition to the set of transcribed texts and the reference textual passage.

5. The system of claim 4, wherein the demographic information extracted from the speech samples for each of the plurality of speakers includes at least one of:
age groups information;
gender information;
ethnicity information;
race information;
accent information; or
dialect information.

6. The system of claim 4, wherein the processor is further configured to execute the computer instructions to:
provide a user interface for enter validation demographic information of the plurality of speakers;
receive the validation demographic information from sociolinguistic expert via the user interface;
automatically quantify the bias in the at least one ASR model based on, in addition to the set of transcribed texts and the reference textual passage, the extracted demographic information of the plurality of the speakers that is validate by a validation circuitry according to the extracted demographic information and the validation demographic information.

7. The system of claim 4, wherein the bias comprises gender bias.

8. The system of claim 4, wherein the reference textual passage comprises a variety of balanced phonetic sounds.

9. The system of claim 8, wherein to automatically quantify the bias in the at least one ASR model based on the set of transcribed texts and the reference textual passage comprises:
convert the reference textual passage to a reference phoneme sequence using a text-to-phoneme circuitry;
convert each of the set of transcribed texts to a set of target phoneme sequences; and
automatically quantify the bias in the at least one ASR model based on quantifying differences between the reference phoneme sequence and the set of target phoneme sequences.

10. The system of claim 1, wherein the processor is further configured to execute the computer instructions to:
obtain a reference speech;
extract a set of speech parameters from the reference speech;
adjust the set of speech parameters to generate a modified set of speech parameters;
generate at least one new speech based on the modified set of speech parameters; and
retrain the ASR model using at least the at least one new speech.

11. A method performed by a system comprising a memory circuitry for storing computer instructions and a processor for executing the computer instructions to perform the method, the method comprising:

receiving speech samples uttered by a plurality of speakers;

determining a reference textual passage;

converting the reference textual passage into a set of machine-generated speeches corresponding to the plurality of speakers by automatically processing the reference textual passage and the speech samples using an automatic neural voice cloning model;

processing the set of machine-generated speeches to produce a set of transcribed texts using at least one Automatic Speech Recognition (ASR) model; and automatically quantifying a bias in the at least one ASR model based on the set of transcribed texts and the reference textual passage.

12. The method of claim 11, further comprising automatically detect background noises in the speech samples.

13. The method of claim 12, further comprising:

automatically removing the background noises from the speech samples and convert the reference textual passage into the set of machine-generated speeches corresponding to the plurality of speakers by automatically processing the reference textual passage and the speech samples using the automatic neural voice cloning model and with the background noises removed from the speech samples.

14. The method of claim 11, further comprising:

extracting demographic information of the plurality of speakers from the speech samples using an automatic demographic information extraction circuitry; and automatically quantifying the bias in the at least one ASR model based on the extracted demographic information of the plurality of the speakers in addition to the set of transcribed texts and the reference textual passage.

15. The method of claim 14, wherein the demographic information extracted from the speech samples for each of the plurality of speakers includes at least one of:

age groups information;

gender information;

ethnicity information;

race information;

accent information; or dialect information.

16. The method of claim 14, further comprising:

providing a user interface for enter validation demographic information of the plurality of speakers;

receiving the validation demographic information from sociolinguistic expert via the user interface;

automatically quantifying the bias in the at least one ASR model based on, in addition to the set of transcribed texts and the reference textual passage, the extracted demographic information of the plurality of the speakers that is validate by a validation circuitry according to the extracted demographic information and the validation demographic information.

17. The method of claim 14, wherein the bias comprises gender bias.

18. The method of claim 14, wherein the reference textual passage comprises a variety of balanced phonetic sounds.

19. The method of claim 18, wherein automatically quantifying the bias in the at least one ASR model based on the set of transcribed texts and the reference textual passage comprises:

converting the reference textual passage to a reference phoneme sequence using a text-to-phoneme circuitry;

converting each of the set of transcribed texts to a set of target phoneme sequences; and automatically quantifying the bias in the at least one ASR model based on quantifying differences between the reference phoneme sequence and the set of target phoneme sequences.

20. The method of claim 11, further comprising:

obtaining a reference speech;

extracting a set of speech parameters from the reference speech;

adjusting the set of speech parameters to generate a modified set of speech parameters;

generating at least one new speech based on the modified set of speech parameters; and retraining the ASR model using at least the at least one new speech.

* * * * *